(12) United States Patent
Courpet et al.

(10) Patent No.: US 9,885,436 B2
(45) Date of Patent: Feb. 6, 2018

(54) CONNECTOR FOR SECURING DOUBLE SKIN PIPEWORK AND ASSEMBLY OBTAINED

(71) Applicant: Airbus Operations SAS, Toulouse (FR)

(72) Inventors: Alexis Courpet, Fronton (FR); Thomas Barre, Toulouse (FR); Olivier Bourbon, Aucamville (FR); Matthieu Biteau, Toulouse (FR); Jean-Marc Roques, Colomiers (FR); Sébastien Escande, Pins-Justaret (FR); Brice Lenoir, Toulouse (FR)

(73) Assignee: Airbus Operations SAS (FR)

( * ) Notice: Subject to any disclaimer, the term of this patent is extended or adjusted under 35 U.S.C. 154(b) by 1136 days.

(21) Appl. No.: 14/065,829

(22) Filed: Oct. 29, 2013

(65) Prior Publication Data

US 2014/0117162 A1 May 1, 2014

(30) Foreign Application Priority Data

Oct. 31, 2012 (FR) .................................... 12 60420

(51) Int. Cl.
*F16L 39/04* (2006.01)
*B64C 1/12* (2006.01)
*F16L 3/18* (2006.01)
*F16L 39/00* (2006.01)
*F16L 25/01* (2006.01)
(Continued)

(52) U.S. Cl.
CPC ................ *F16L 39/04* (2013.01); *B64C 1/12* (2013.01); *F16L 3/18* (2013.01); *F16L 39/005* (2013.01); *B64D 37/005* (2013.01); *B64D 37/32* (2013.01); *F16L 25/01* (2013.01); *Y10T 29/49815* (2015.01)

(58) Field of Classification Search
CPC . F16L 39/04; F16L 39/005; F16L 3/18; F16L 25/01; F16L 25/025; F16L 27/12; B64D 37/32; B64D 37/00; B64D 37/005; B64C 1/12; Y10T 29/49815
USPC ......... 285/15, 24, 61, 62, 123.3, 123.5, 184, 285/224; 244/135 A, 131, 132
See application file for complete search history.

(56) References Cited

U.S. PATENT DOCUMENTS 3,968,323 A * 7/1976 Blanchet ................ F16L 3/227
174/135
4,357,860 A * 11/1982 Krzak ....................... F16L 3/01
(Continued)

FOREIGN PATENT DOCUMENTS

DE   10 2009 052674 A1   5/2011
FR        2 946 103 A1   12/2010
(Continued)

*Primary Examiner* — Gregory J Binda
*Assistant Examiner* — Zachary T Dragicevich
(74) *Attorney, Agent, or Firm* — Lerner, David, Littenberg, Krumholz & Mentlik, LLP

(57) ABSTRACT

A connector for securing floating double skin pipework to a structure includes mechanism for securing to the structure, and an external body forming an outer channel and an internal tube forming an inner channel around the longitudinal axis of the connector. The mechanism for securing to the structure includes a fixed connection backed up by a sliding connection along the longitudinal axis of the connector. The connector includes at least one bore for producing the fixed connection and at least one holding rail for producing the sliding connection.

8 Claims, 5 Drawing Sheets

(51) Int. Cl.
*B64D 37/00* (2006.01)
*B64D 37/32* (2006.01)

(56) References Cited

U.S. PATENT DOCUMENTS

| | | | |
|---|---|---|---|
| 4,564,041 A * | 1/1986 | Kramer | F16L 37/26 |
| | | | 137/315.01 |
| 7,717,473 B1 * | 5/2010 | Zhang | F16L 27/026 |
| | | | 285/121.1 |
| 2007/0051404 A1 * | 3/2007 | Challender | F16L 39/04 |
| | | | 137/15.1 |
| 2011/0147527 A1 * | 6/2011 | Calvino | F16L 27/107 |
| | | | 244/135 A |
| 2012/0049510 A1 * | 3/2012 | Cafri | F24J 2/4647 |
| | | | 285/121.3 |
| 2012/0057267 A1 * | 3/2012 | Petit | F16L 25/025 |
| | | | 361/215 |
| 2012/0181384 A1 | 7/2012 | Courpet et al. | |
| 2012/0217739 A1 | 8/2012 | Weinhold | |
| 2012/0228865 A1 * | 9/2012 | Sopoliga | F16L 27/12 |
| | | | 285/123.15 |

FOREIGN PATENT DOCUMENTS

| | | |
|---|---|---|
| FR | 2 948 254 A1 | 1/2011 |
| GB | 1 192 700 A | 5/1970 |
| WO | 2007/057629 A1 | 5/2007 |

\* cited by examiner

CONNECTOR FOR SECURING DOUBLE SKIN PIPEWORK AND ASSEMBLY OBTAINED

FIELD OF INVENTION

The present invention relates to a connector for securing floating double skin pipework, and to an assembly of floating double skin pipework on a structure, said assembly being produced by way of this securing connector.

BACKGROUND OF THE INVENTION

Pipework that conveys kerosene or any other inflammable fluid in the pressurized zone of an aircraft fuselage is:
- either what is known as rigid pipework having crimped connections between the various portions of the pipework,
- or what is known as floating pipework having connections that allow relative movements of the various portions of the pipework.

In the case of floating pipework, the pipework is doubled in order to contain and evacuate any leaks of inflammable fluid.

As illustrated in FIG. 1, floating double skin pipework 10 is connected to the structure 12 of the aircraft via a securing connector 14.

This securing connector 14 comprises means 16 for securing to the structure 12 and makes it possible to produce a floating connection between the ends of two portions (18, 20) of the floating double skin pipework 10.

In order to produce this connection, the body 22 of the connector 14 forms an outer channel 24 that ensures the continuity of the outer duct 26 of the floating double skin pipework 10, and the connector 14 comprises an inner tube 28 forming an inner channel 30 that ensures the continuity of the inner duct 32 of the floating double skin pipework 10.

Sealing means 34, such as O-rings, are provided to ensure leaktightness between the outer channel 24 and inner channel 30 and the outer duct 26 and inner duct 32 of the floating double skin pipework 10.

On account of the dangerous nature of the fluids transported, these sealing means 34 have to be inspected regularly, in particular during maintenance work.

To this end, the body 22, and thus the outer channel 24, of the connector 14 is extended at each of its ends by outer sleeves (33-1, 33-2) that make it possible to inspect the sealing means 34 located between the inner channel 30 and the inner duct 32 of the pipework.

These outer sleeves (33-1, 33-2) are secured to the body 22 with the aid of removable securing means 31, and in their interior they comprise seal bearing surfaces (35-1, 35-2) of the sealing means 34 between the outer channel 24 and the inner duct 32 of the pipework 10, the seal bearing surfaces (29-1, 29-2) of the sealing means 34 between the inner channel 30 and the inner duct 32 of the pipework 10 being located inside the inner tube 28.

During particular maintenance work, a worker may need to replace one or more defective portions of the floating double skin pipework 10.

In order to replace a defective portion, a first method consists in completely removing the floating double skin pipework 10 and its connectors 14.

This first method is not optimal since it involves systematically replacing the sealing means 34: each O-ring being removed before being replaced.

In addition, depending on the length of the floating double skin pipework 10 and the number of connectors 14, the removal time may be very long just to replace a portion of the pipework.

Thus, according to a second method illustrated in FIG. 2, the worker removes one or more connectors 14 and, as indicated by the arrow C, slides a connector 14 over a portion 36 of the pipework 10 which is not intended to be replaced, in order to release the defective portion.

This second method makes it possible to protect the seals of the connectors 14 that are not removed and to reduce the removal time.

However, this second method also has drawbacks.

Therefore, as illustrated in FIG. 2, the portion 36 of the pipework 10 which is not to be replaced is suspended by one of its ends on a connector 14 that is not removed, and has a removed connector 14 remaining on and weighing down its other end.

The consequence of this non-removed portion 36 being held in a suspended manner is that the surfaces of the joint bearing surfaces (35-1, 35-2, 29-1, 29-2) of the sealing means 34 of the non-removed connector 14 are damaged.

This is because the non-removed portion 36 is in an inclined position with respect to the axis A10 of the pipework 10, said position not being envisioned when the connector 14 was designed, the design envisioning a maximum angle between the pipework 10 and the connector 14 of more or less 2 degrees.

In more detail, and as illustrated by way of dashed lines in FIG. 1, the inclined position of the non-removed portion 36 gives rise to undesirable metal/metal contacts 38 between the pipework 10 and the seal bearing surfaces (35-1, 35-2, 29-1, 29-2) of the sealing means 34.

Finally, the design of a connector 14 according to the prior art has drawbacks with regard to the second removal method.

Specifically, the securing means 16 do not allow any mobility of the connector 14 with respect to the structure 12; it is necessary to detach the two outer sleeves (33-1, 33-2) of the body 22 of the connector 14 and then to detach the connector 14 from the structure 12 in order to be able to extract the portion of the pipework 10 to be removed from the connector.

BRIEF SUMMARY OF THE INVENTION

Thus, the present invention aims to alleviate the drawbacks of the prior art. To this end, an embodiment of the invention is a connector for securing floating double skin pipework to a structure, the connector comprising means for securing to the structure, and also an external body forming an outer channel and an internal tube forming an inner channel around the longitudinal axis of the connector.

According to an embodiment of the invention, the connector is characterized in that its means for securing to the structure comprise a fixed connection backed up by a sliding connection along the longitudinal axis of the connector, the connector comprising at least one bore for producing the fixed connection and at least one holding rail for producing the sliding connection.

By virtue of this sliding connection provided as a complement to the fixed connection, the connector does not have to be completely detached from the structure in order to allow a portion of the floating double skin pipework to be removed.

In addition, by continuing to be connected to the structure, the connector makes it possible to continue to hold the end of the portion of the pipework which is not removed. This thus avoids the situation in which this portion remains suspended by its other end.

BRIEF DESCRIPTION OF THE DRAWINGS

Further features and advantages will become apparent from the following description of the invention, this description being given only by way of example, with reference to the appended drawings, in which.

DETAILED DESCRIPTION

Figure 1:
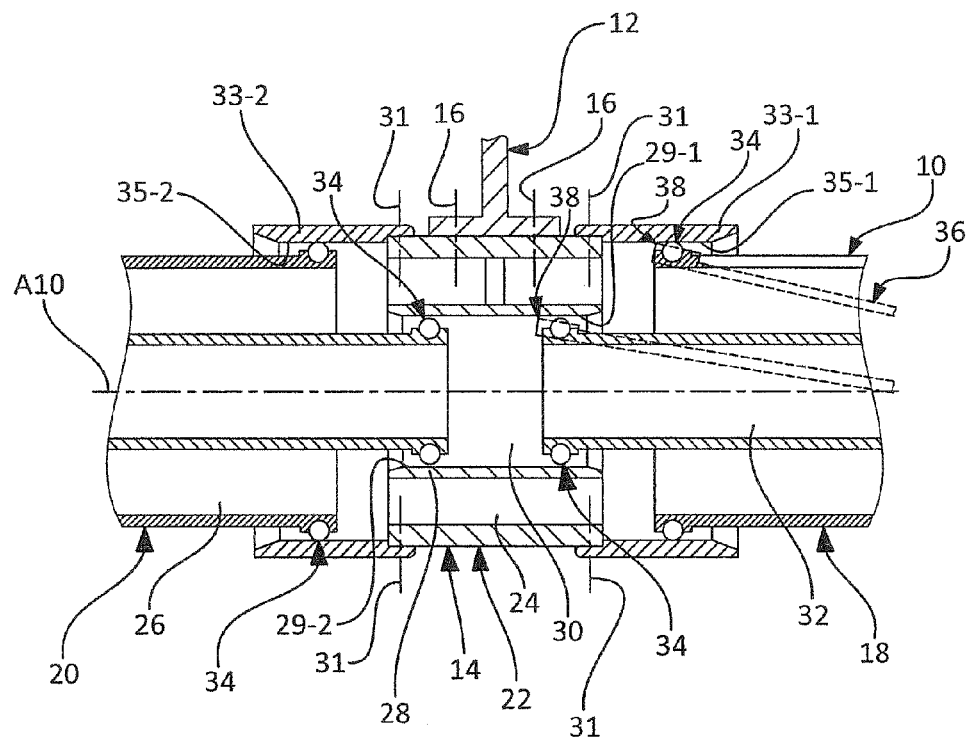
FIG. 1 is a cross section through a connector according to the prior art.
Figure 2:
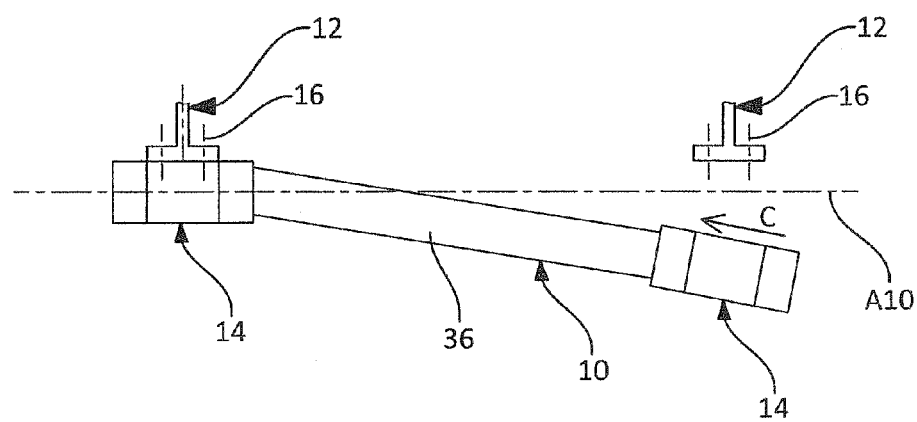
FIG. 2 illustrates a method for removing floating double skin pipework secured to a structure by way of connectors according to the prior art.
Figure 3:
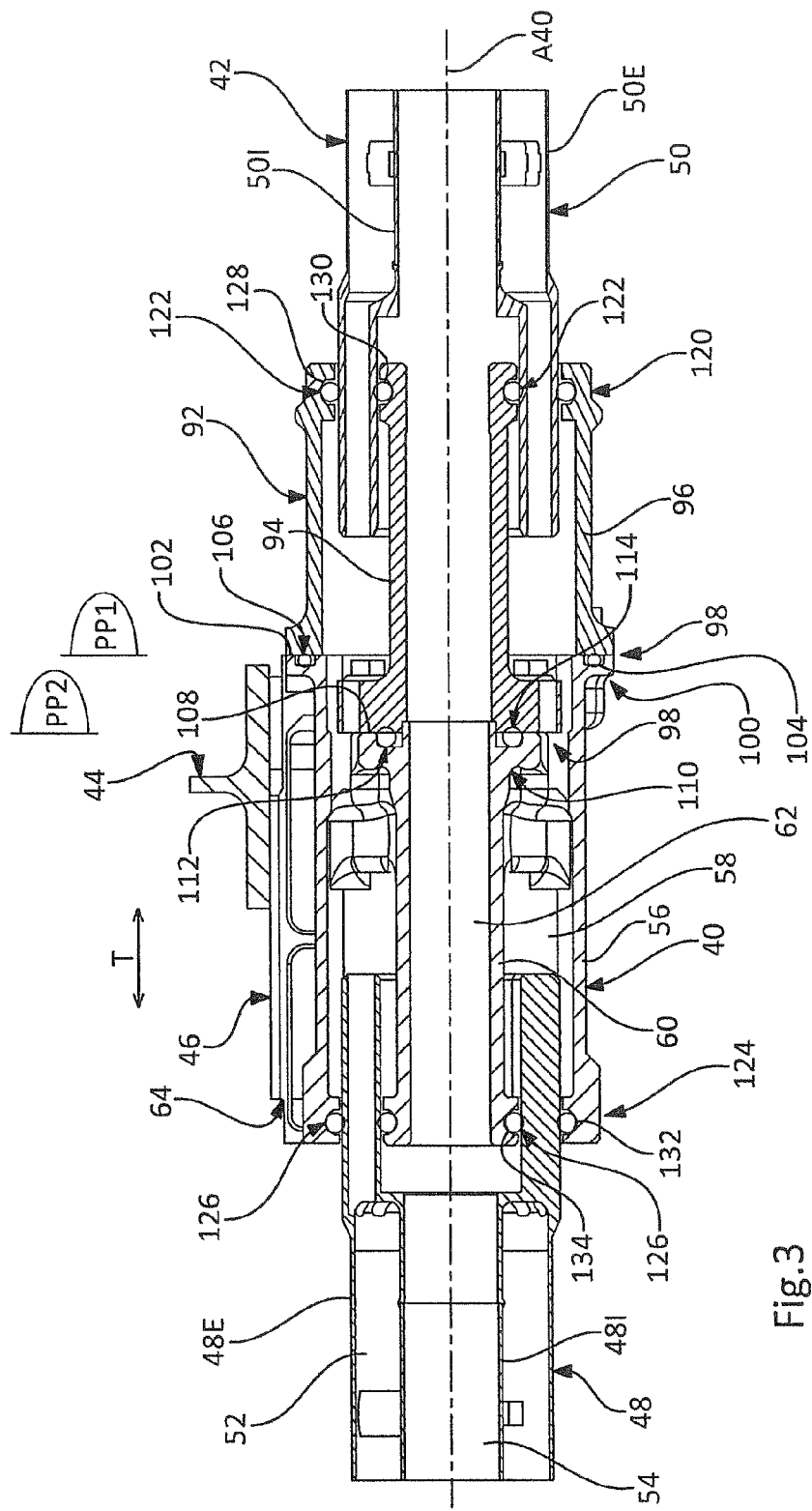
FIG. 3 is a cross section through doubled pipework secured to a structure by way of a connector according to an embodiment of the invention.

As illustrated in FIG. 3, the present invention relates to a connector 40 for securing floating double skin pipework 42 to a structure 44.

In an application of an embodiment of the present invention, the connector 40 makes it possible to secure pipework used for conveying inflammable fluids in an aircraft fuselage.

To this end, the securing connector 40 comprises means 46 for securing to the structure 44, and it makes it possible to produce a floating connection between an upstream portion 48 and a downstream portion 50 of the pipework 42.

Since the doubled pipework 42 comprises an outer duct 52 and an inner duct 54, each of the upstream portion and the downstream portion 50 comprises an inner pipe (48I, 50I) and an outer pipe (48E, 50E).

In order to produce the floating connection of the upstream portion 48 and downstream portion 50, the connector 40 comprises an external body 56 that forms an outer channel 58 and an internal tube 60 that forms an inner channel 62 around the longitudinal axis A40 of the connector.

The outer channel 58 ensures the continuity of the outer duct 52 of the pipework 42, and the inner channel ensures the continuity of the inner duct 54 of the pipework 42.

According to an embodiment of the invention, the means 46 for securing the connector 40 to the structure 44 comprise a sliding connection 64 along the longitudinal axis A40 of the connector and a fixed connection 86 to the structure 44, the sliding connection 64 backing up the fixed connection 86.

Thus, during maintenance work, and after having removed the fixed connection 86, it is possible to slide the connector 40 with respect to the structure 44 without completely detaching it from the latter.

In order to produce the sliding connection 64, the connector 40 comprises at least one holding rail (66-1, 66-2, 67, 74-1, 74-2).

In a first variant embodiment of the securing means 46 which is illustrated in FIGS. 3, 4, 5 and 8, the sliding connection 64 has internal guidance, at least one holding rail (66-1, 66-2, 67) secured to the body 56 of the connector being intended to slide in grooves (68-1, 68-2) in two profiled elements (70-1, 70-2) forming a fixed support 72.

Figure 4:
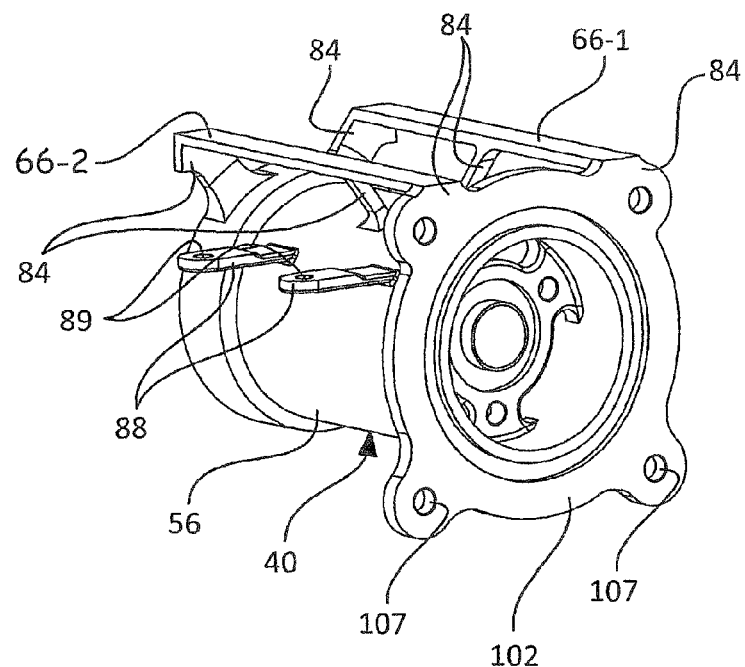
FIG. 4 is a perspective view of a connector according to an embodiment of the invention, with an inner sleeve secured thereto and with a first variant of its securing means.
Figure 5:
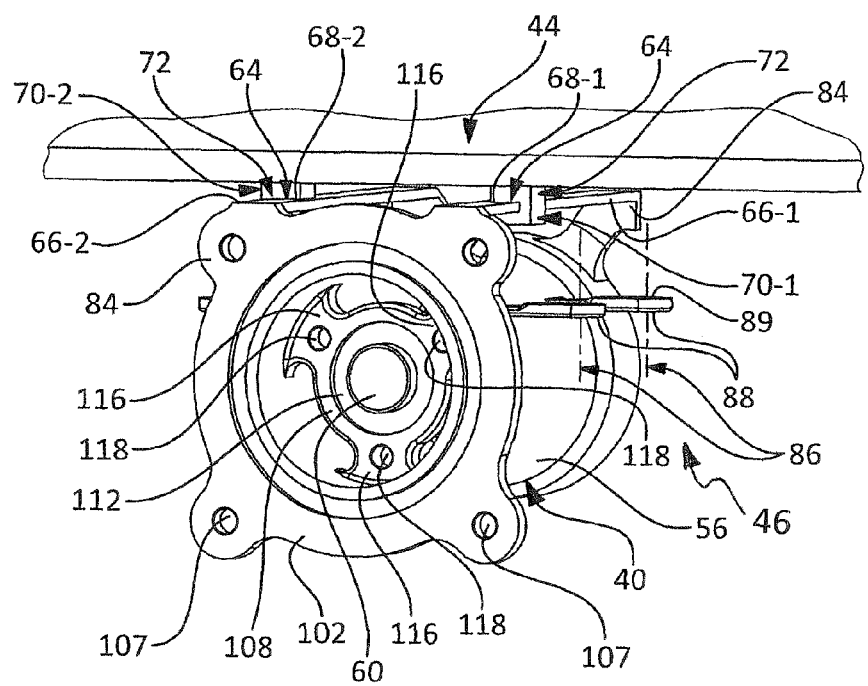
FIG. 5 is a perspective view of a connector according to an embodiment of the invention, mounted on a structure by way of a first variant of its securing means.

Preferably, and as illustrated in FIGS. 3, 4 and 5, two holding rails (66-1, 66-2) secured to the body 56 of the connector are intended to slide in the grooves (68-1, 68-2) in the fixed support 72.

The support 72 is known as a fixed support because it is intended to be connected fixedly to the structure 44 by any appropriate means.

In this first variant embodiment of the securing means 46, the two profiled elements (70-1, 70-2) forming the fixed support 72 follow a C-shaped section and are mounted with their grooves (68-1, 68-2) facing one another, the holding rail or rails (66-1, 66-2, 67) following a flat profile corresponding to that of the grooves (68-1, 68-2).

Figure 6:
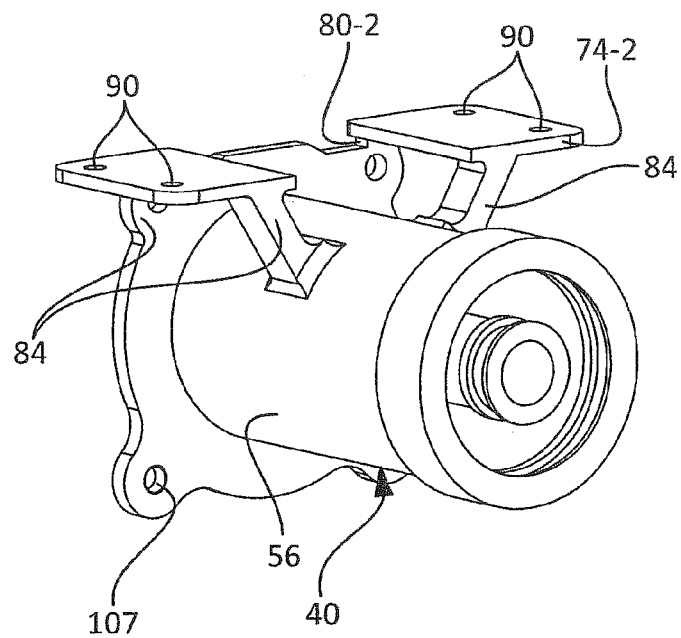
FIG. 6 is a perspective view of a connector according to an embodiment of the invention, with a second variant of its securing means.
Figure 7:
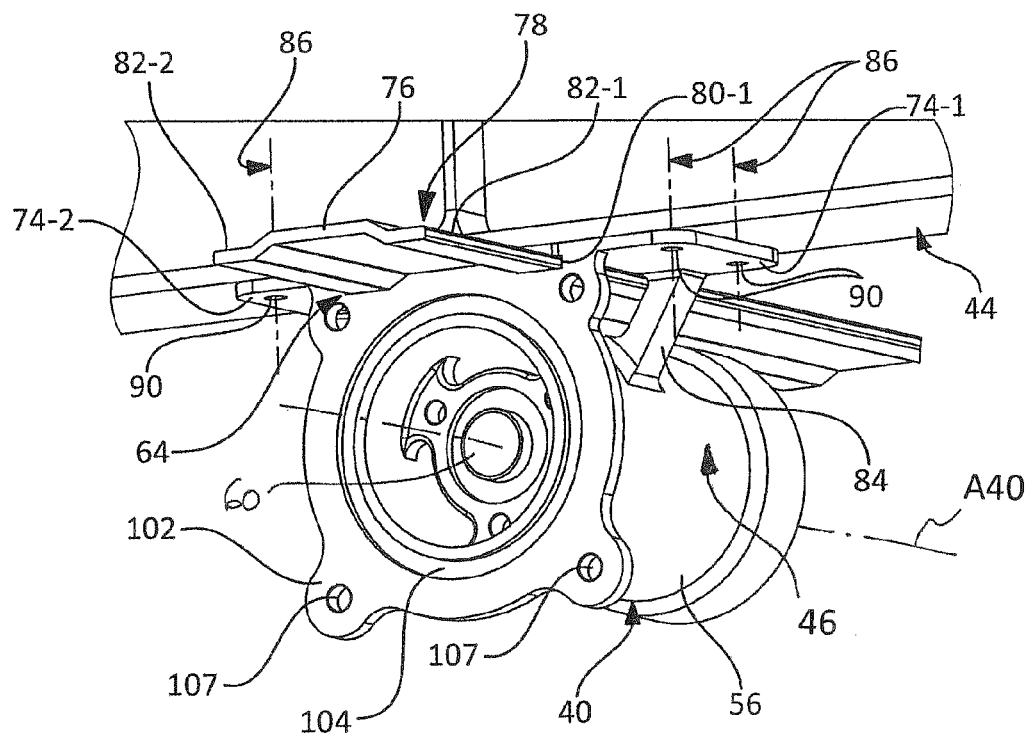
FIG. 7 is a perspective view of a connector according to an embodiment of the invention, mounted on a structure by way of a second variant of its securing means.

In a second variant embodiment of the securing means 46 which is illustrated in FIGS. 6 and 7, the sliding connection 64 has external guidance, two holding rails (74-1, 74-2) secured to the body 56 of the connector being intended to slide around a profiled element 76 forming a fixed support 78.

The support 78 is known as a fixed support because it is intended to be connected fixedly to the structure 44 by any appropriate means.

In this second variant embodiment of the securing means 46, the profiled element 76 forming the fixed support follows an Q-shaped section, and the two holding rails (74-1, 74-2) comprise grooves (80-1, 80-2) that are attached to the lateral edges (82-1, 82-2) of the profiled element 76.

In the first and second variant embodiments of the securing means 46, since the body 56 of the connector is preferably cylindrical, the holding rails (66-1, 66-2, 67, 74-1, 74-2) are connected to the body 56 by arms 84.

In order to lock the securing of the connector 40 to the structure 44 when the pipework 42 is mounted and for example used in an aircraft in operation, the securing means 46 comprise a fixed connection 86.

This fixed connection 86 is removable in order to be able to release the sliding connection 64 and slide the connector 40.

When it is produced, this fixed connection 86 immobilizes the connector 40 with respect to the structure 44.

In order to be able to be removed, this fixed connection 86 is for example produced by way of screws that connect the connector 40 to the structure 44.

Thus, the connector 40 comprises at least one bore (89, 90) for producing this fixed connection 86, these bores (89, 90) serving for example to receive the screws of the removable fixed connection 86.

Figure 8:
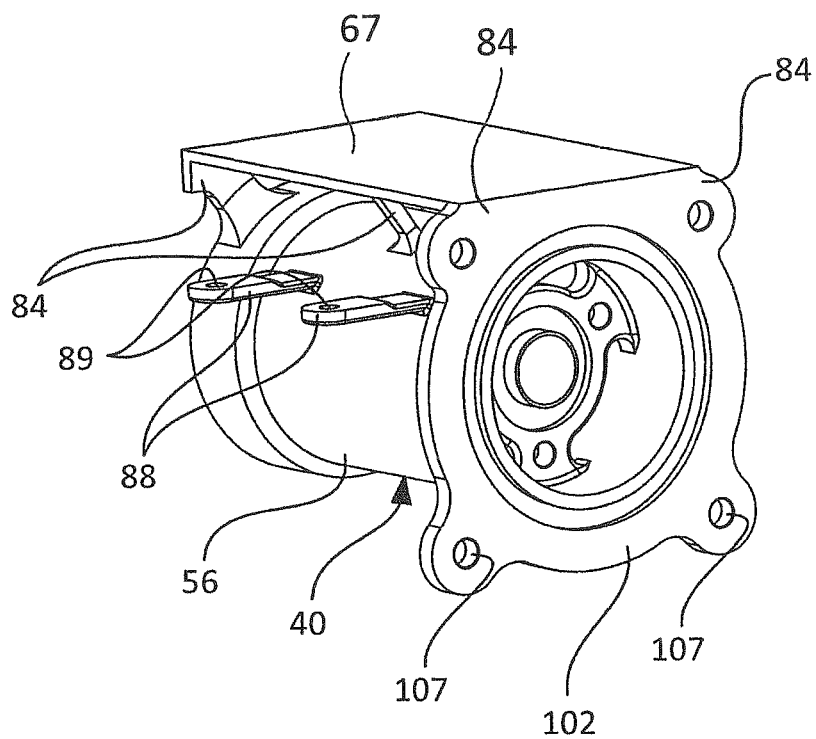
FIG. 8 is a perspective view of a connector according to an embodiment of the invention, with an inner sleeve secured thereto and with a first variant of its securing means having a single rail.

In the first variant embodiment of the securing means 46 which is illustrated in FIGS. 4, 5 and 8, the connector 40 comprises at least one securing lug 88 extending from the body 56 of the connector, and at least one bore 89 of the fixed connection 86 is produced in this securing lug 88.

Preferably, the connector 40 comprises two securing lugs 88 on either side of its body 56, the bores 89 being produced at the outer ends of these securing lugs 88.

In the second variant embodiment of the securing means 46, at least one bore 90 of the fixed connection 86 is produced in one of the holding rails (74-1, 74-2).

Preferably, two bores 90 are produced in each holding rail (74-1, 74-2).

By virtue of the mobility in translation T of the connector 40 that is enabled by the sliding connection 64 when the fixed connection 86 is removed, and as illustrated in FIG. 3, the floating connection produced by the connector 40 only requires one double skin sleeve 92 in order to be able to remove one of the upstream portion 48 or downstream portion 50 of the pipework 42 without having to incline said portion or leave it suspended for this purpose.

This double skin sleeve 92 comprises an internal sleeve 94 and an external sleeve 96.

The internal sleeve 94 and the external sleeve 96 respectively ensure the continuity of the inner duct 54 of the pipework 42 with the inner channel 62 of the connector, and the continuity of the outer duct 52 of the pipework 42 with the outer channel 58 of the connector.

Thus, according to an embodiment of the invention, the connector 40 comprises a connection interface 98 for a double skin sleeve 92 at only one of its ends 100.

For reasons of safety, the presence of the external sleeve 96 is obligatory so that the leaktightness of the floating connection produced between the inner pipe 48I of the upstream portion 48 and the inner pipe 50I of the downstream portion 50 can be confirmed.

Thus, the connection interface 98 comprises an external bearing surface 102 for receiving and securing the external sleeve 96 at the end 100 of the external body 56 of the connector.

In a preferred variant embodiment of the interface 98, this external bearing surface 102 is located in a plane PP1 perpendicular to the longitudinal axis A40 of the connector and incorporates a housing 104, such as a peripheral groove, for sealing means 106, such as an O-ring.

Still in this preferred variant embodiment of the interface 98, the external bearing surface 102 comprises bores 107 for securing the external sleeve 96, said securing being realized with the aid of removable securing means, such as screws.

Optionally, and as illustrated in FIGS. 4 and 5, the external bearing surface 102 does not incorporate a housing for sealing means, this housing being provided in the corresponding bearing surface of the external sleeve 96.

In order to facilitate the mounting and removal of the upstream portion 48 or downstream portion 50 of the pipework 42, the connection interface 98 comprises an internal bearing surface 108 for receiving and securing the internal sleeve 94 at the end 110 of the internal tube 60 closest to the end 100 of the external body 56 of the connector.

In a preferred variant embodiment of the interface 98, the internal bearing surface 108 is located in a plane PP2 perpendicular to the longitudinal axis A40 of the connector.

This internal bearing surface 108 incorporates a housing 112, such as a peripheral groove, for sealing means 114, such as an O-ring.

Still in this preferred variant embodiment of the interface 98, and as illustrated in FIG. 5, with internal branches 116 connecting the internal tube 60 to the external body 56 of the connector, these internal branches 116 form extensions of the internal bearing surface 108 in which the bores 118 for securing the internal sleeve 94 are produced, said securing being realized with the aid of the removable securing means, such as screws.

In order to ensure the electrical connection between the pipes (48E, 48I, 50E, 50I) of the portions (48, 50) of the pipework 42 and the structure 44, the connector 40 and the double skin sleeve 92 are produced from a metal material.

Preferably, the connector 40 is obtained by a moulding process.

According to an embodiment of the invention, the double skin sleeve 92 comprises, at its free end 120, sealing means 122 with respect to the downstream portion 50 of the pipework, and the connector 40 also comprises, at its free end 124, sealing means 126 with respect to the upstream portion 48 of the pipework.

More specifically, the external sleeve 96 and the internal sleeve 94 comprise housings (128, 130) for receiving sealing means 122 at the free end 120 of the sleeve 92, and the external body 56 and the internal tube 60 comprises housings (132, 134) for receiving sealing means 126 at the free end 124 of the connector 40.

Therefore, the design of the pipes (48E, 48I, 50E, 50I) of the portions (48, 50) of the pipework 42 is simplified because their ends no longer comprise a housing for the sealing means, but only the planar surfaces against which the sealing means (122, 126) rest.

The connector 40 according to an embodiment of the invention makes it possible to avoid having suspended connectors during maintenance work, to ensure that portions of pipework adjacent to a removed portion are held on the structure during maintenance work, and to ensure leaktightness at the floating connection between two portions of the pipework.

More generally, the connector may be integrated easily into existing installations in order to facilitate installation and maintenance work for doubled pipework.

The present invention also covers an assembly of floating double skin pipework 42 on a structure 44, wherein the assembly is produced by way of a connector 40, and an aircraft structure comprising such an assembly.

Finally, the present invention also relates to a method for removing floating double skin pipework 42.

With the floating double skin pipework 42 being assembled on the structure 44 by way of a connector 40 according to an embodiment of the invention, and this connector 40 making it possible to produce a floating connection between an upstream portion 48 and a downstream portion 50 of the pipework 42, the removal process consists in removing the fixed connection 86 of the connector 40 to the structure 44 and then in removing at least one portion 48, 50 of the pipework 42 by sliding the connector 40 with respect to the structure 44 but without completely detaching this connector 40 from this structure 44.

In addition, with the connector 40 comprising the connection interface 98 for the double skin sleeve 92 at one of its ends 100, and this double skin sleeve 92 being used to receive the upstream portion 48 or downstream portion 50 of pipework 42, this removal method also provides for this double skin sleeve 92 to be detached from the connector 40 in order to remove the portion 48 or 50 held by this sleeve 92.

The invention claimed is:

1. A connector for securing floating double skin pipework to a structure, the connector comprising:
   means for securing to the structure; and an external body forming an outer channel and an internal tube forming an inner channel around a longitudinal axis of the connector, wherein the means for securing to the structure comprise a fixed connection backed up by a sliding connection that permits the connector to translate along a direction parallel to a longitudinal axis of the external body, the connector comprising at least one bore for producing the fixed connection and at least one holding rail for producing the sliding connection, wherein the sliding connection has external guidance and first and second holding rails secured to the body of the connector configured to slide around a profiled element forming a fixed support, and wherein at least one bore of the fixed connection is produced in one of the first and second holding rails.

2. The connector according to claim 1, wherein the connector is obtained by a moulding process.

3. A connector for securing floating double skin pipework to a structure, the connector comprising:

means for securing to the structure; and an external body forming an outer channel and an internal tube forming an inner channel around a longitudinal axis of the connector, wherein the means for securing to the structure comprise a fixed connection backed up by a sliding connection that permits the connector to translate along a direction parallel to a longitudinal axis of the external body, the connector comprising at least one bore for producing the fixed connection and at least one holding rail for producing the sliding connection, wherein the connector comprises a connection interface for a double skin sleeve at only one end of the connector, wherein the connection interface comprises an internal bearing surface for receiving and securing an internal sleeve of the double skin sleeve at the end of the internal tube closest to the end of the external body of the connector, and wherein the internal bearing surface incorporates a housing for sealing means.

4. The connector according to claim 3, wherein the internal bearing surface is located in a plane perpendicular to the longitudinal axis of the connector.

5. A connector for securing floating double skin pipework to a structure, the connector comprising:

means for securing to the structure; and an external body forming an outer channel and an internal tube forming an inner channel around a longitudinal axis of the connector, wherein the means for securing to the structure comprise a fixed connection backed up by a sliding connection that permits the connector to translate along a direction parallel to a longitudinal axis of the external body, the connector comprising at least one bore for producing the fixed connection and at least one holding rail for producing the sliding connection, wherein the connector comprises a connection interface for a double skin sleeve at only one end of the connector, wherein the connection interface comprises an external bearing surface for receiving and securing an external sleeve of the double skin sleeve at one end of the external body of the connector; and wherein the external bearing surface is located in a plane perpendicular to the longitudinal axis of the connector and incorporates a housing for sealing means.

6. An aircraft structure comprising an assembly of floating double skin pipework on a structure, the double skin pipework having a longitudinal axis, wherein the assembly is produced by way of a connector, the connector comprising:

means for securing to the structure; and an external body forming an outer channel and an internal tube forming an inner channel around a longitudinal axis of the connector, the longitudinal axis of the connector coinciding with the longitudinal axis of the double skin pipework, wherein the means for securing to the structure comprise a fixed connection backed up by a sliding connection along the longitudinal axis of the connector, the connector comprising at least one bore for producing the fixed connection and at least one holding rail for producing the sliding connection, the sliding connection permitting a sliding motion of the external body relative to the means for securing to the structure along the longitudinal axis of the double skin pipework.

7. The connector according to claim 6, wherein the sliding connection has internal guidance, at least one holding rail secured to the body of the connector being intended to slide in grooves in first and second profiled elements forming a fixed support.

8. The connector according to claim 7, wherein the connector comprises at least one securing lug extending from the body of the connector; and wherein at least one bore of the fixed connection is produced in the securing lug.

* * * * *